(12) United States Patent
Wang (10) Patent No.: US 8,877,312 B2
(45) Date of Patent: Nov. 4, 2014

(54) FLYING SPLICES TAPE

(71) Applicant: Chung-Chin Wang, Tao Yuan (TW)

(72) Inventor: Chung-Chin Wang, Tao Yuan (TW)

( * ) Notice: Subject to any disclaimer, the term of this patent is extended or adjusted under 35 U.S.C. 154(b) by 0 days.

(21) Appl. No.: 13/845,983

(22) Filed: Mar. 18, 2013

(65) Prior Publication Data

US 2014/0162008 A1   Jun. 12, 2014

(30) Foreign Application Priority Data

Dec. 11, 2012 (TW) .............................. 101146571 A (51) Int. Cl.
| | | |
|---|---|---|
| *B32B 7/12* | (2006.01) | |
| *B32B 9/00* | (2006.01) | |
| *C09J 7/02* | (2006.01) | |
| *B32B 7/06* | (2006.01) | |
| *C09J 133/08* | (2006.01) | |

(52) U.S. Cl.
CPC ... *C09J 7/02* (2013.01); *B32B 7/06* (2013.01); *C09J 133/08* (2013.01); *C09J 7/0296* (2013.01); *C09J 2201/128* (2013.01); *C09J 2203/342* (2013.01); *C09J 2400/283* (2013.01); *C09J 2401/006* (2013.01); *C09J 2403/006* (2013.01); *C09J 2423/106* (2013.01); *C09J 2433/00* (2013.01); *C09J 2475/005* (2013.01); *C09J 2477/005* (2013.01)
USPC ........... 428/40.1; 428/343; 428/352; 428/354

(58) Field of Classification Search
CPC ............ C09J 2203/342; C09J 2403/00; C09J 2403/001; C09J 2403/003; C09J 2403/005; C09J 2403/006; C09J 2403/008; C09J 101/24; C09J 133/08; C09J 7/02; C09J 7/0296; C09J 2433/00; C09J 2475/005; C09J 2477/005; C09J 2201/128; C09J 2400/283; C09J 2401/006; C09J 2423/106
USPC ............... 428/40.1, 42.2, 42.3, 343, 352, 354
See application file for complete search history.

(56) References Cited

U.S. PATENT DOCUMENTS

| | | | |
|---|---|---|---|
| 7,087,278 B2 * | 8/2006 | Eikmeier et al. ............. | 428/40.1 |
| 2009/0098327 A1 * | 4/2009 | Buchbinder et al. ......... | 428/40.9 |
| 2010/0119803 A1 * | 5/2010 | Kosaka et al. ................ | 428/222 |
| 2012/0045604 A1 * | 2/2012 | Gavel et al. .................. | 428/41.8 |

* cited by examiner

*Primary Examiner* — Patricia L Nordmeyer
(74) *Attorney, Agent, or Firm* — Muncy, Geissler, Olds & Lowe, P.C.

(57) ABSTRACT

A flying splices tape comprising a tape body which is used in bonding two laminate sheets and further comprises a first viscose layer, a carrier layer, a split layer based on starch, and a second viscose layer sequentially stacked. As such, the present invention of a flying splices tape which depends on water-soluble viscose layers as environment-friendly media features simplified structure and truly stable effect, facilitating manufacture conforming to economic efficiency, making sure of quality, and promoting market competitiveness.

18 Claims, 9 Drawing Sheets

FIG. 1

(Prior Art)

FLYING SPLICES TAPE

BACKGROUND OF THE INVENTION

1. Field of the Invention

The present invention relates to a flying splices tape, particularly a flying splices tape used in fast bonding former and latter paper sheets and featuring excellent manufacturing convenience, economic efficiency and environmental protection.

2. Description of the Related Art

Figure 1:
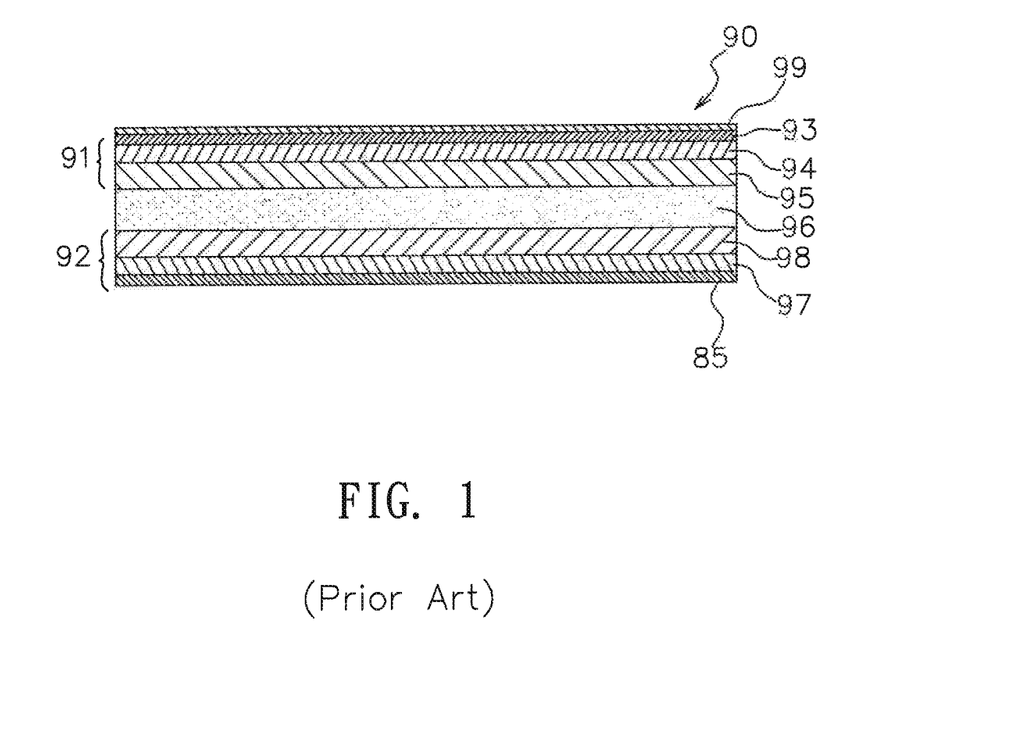
FIG. 1 is a sectional view of a tape based on the prior art.

In the existing printing industry based on paper reels for continuous printing, the leading edge of one paper sheet in a new paper reel must be connected to the trailing edge of another paper sheet in an old paper reel to be exhausted for a fast connection or a flying splice between two pieces of paper. It is necessary for a dynamic fast connection (flying splice) to use media, e.g., a separable flying splices tape, in joining former and latter paper sheets. As shown in FIG. 1 (R.O.C. Patent No. I241953) for technology of flying splices tapes, the flying splices tape 90 comprises (a) a first adhesive tape 91 in which there are a first viscose layer 93, a paper backing 94 and a first isolating layer 95 stacked from top to bottom, (b) a second adhesive tape 92 in which there are a second viscose layer 96, a paper backing 97 and a second isolating layer 98 stacked from bottom to top, and (c) a third viscose layer 96 between the first adhesive tape 91 and the second adhesive tape 92 wherein the first viscose layer 93 joins a double-sided separable pad 99. During a fast connection (a flying splice), the first adhesive tape 91 (the second adhesive tape 92) depends on proper tension applied on a new paper sheet and an old one to separate the third viscose layer 96 and the first isolating layer 95 (the second isolating layer 98).

The flying splices tape 90 based on the prior art for a fast connection (a flying splice) of paper sheets still has some drawbacks, for example, the flying splices tape 90 comprising more composite layers which consume much materials in complicated processes, increasing manufacture costs, and failing to meet economic efficiency. An adhesive force of the third viscose layer 96 relative to the first isolating layer 95 (or the second isolating layer 98) and any cohesion between different layers must be precisely designed within a severe tolerance in order to separate the flying splices tape 90 with tension applied on the third viscose layer 96 and the accompanying first isolating layer 95 (or the second isolating layer 98); otherwise, the flying splices tape 90 which fails in an intended purpose for operation is referred as a complicated and unideal design due to service restriction, inventory, and effect of ambient environment or time on changes of interlayers. Moreover, the third viscose layer 96 in the flying splices tape 90 consists of high polymers such as PVA or synthetic resin which is unconformable to appeal of environmental protection and needs to be corrected. In other words, it is necessary for any person skilled in the art to eliminate drawbacks of the flying splices tape which is based on the prior art.

Accordingly, the inventor having considered an imperfect structural design and other drawbacks in manufacture and usage and attempted to optimize a flying splices tape with features such as convenient manufacture, efficiency and environmental protection has studied and developed the present invention of a flying splices tape.

SUMMARY OF THE INVENTION

The object of the present invention is to provide a flying splices tape which features simplified structure and truly stable effect, facilitates manufacture conforming to economic efficiency, makes sure of quality, and promote market competitiveness.

The other object of the present invention is to provide a flying splices tape which is based on water-soluble viscose layers as media and is a superior environment-friendly product.

To reach the above purposes, the present invention adopts technical measures in which there is a tape body used to bond two laminate sheets and further comprising a first viscose layer, a carrier layer, a split layer (a starchy layer based on starch), and a second viscose layer sequentially stacked.

For technical features and effects in terms of the present disclosure completely understood and recognized, the preferred embodiments and accompanying drawings are described hereinafter.

DETAILED DESCRIPTION OF THE PREFERRED EMBODIMENTS

Figure 2:
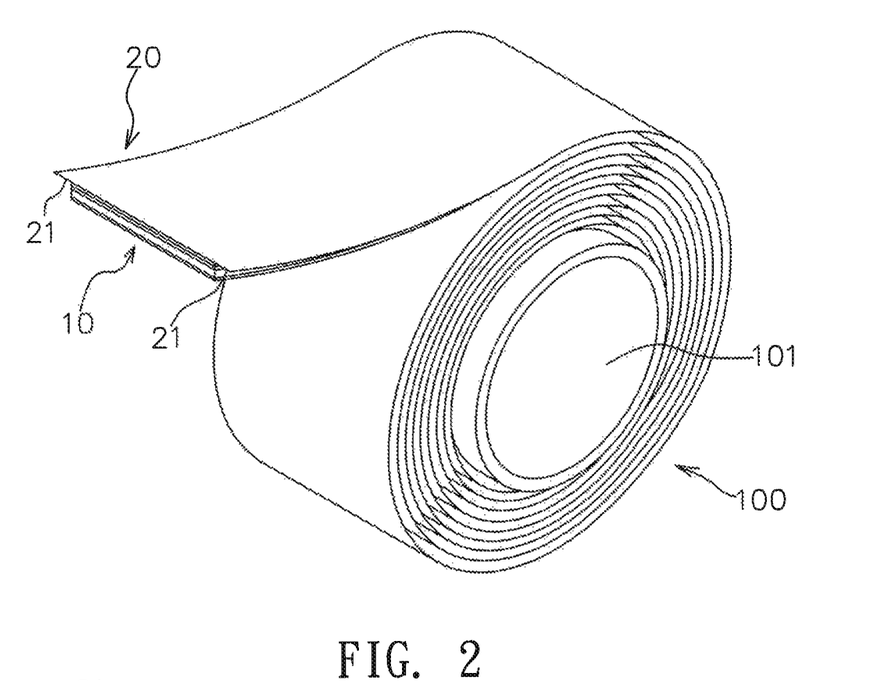
FIG. 2 is a perspective view of the present invention assembled as a reel.
Figure 3:
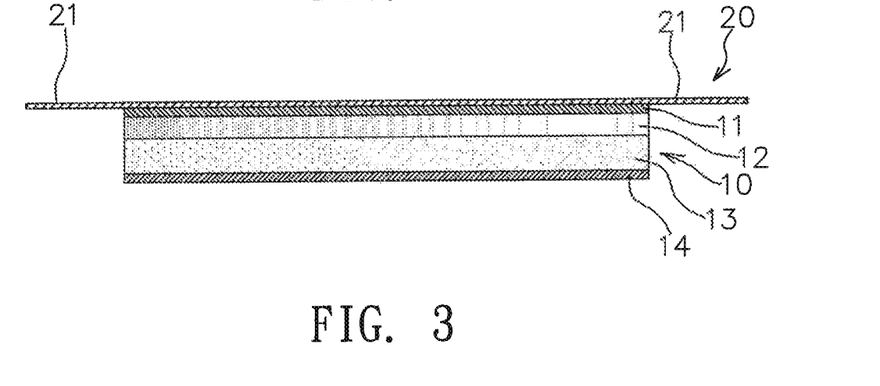
FIG. 3 is a sectional view of the present invention.

Referring to FIGS. 2 and 3 which illustrate the present invention of a flying splices tape comprises a tape body 10 and a de-bounding layer 20, both of which are combined and wound around a reel drum 101 for development of a successive tape 100 which is easily available.

As shown in FIG. 3, the tape body 10 comprises top-down layers such as a first viscose layer 11, a carrier layer 12, a split layer 13 and a second viscose layer 14: the first viscose layer 11 consists of water-soluble viscose, e.g., acrylic viscose; the carrier layer 12 is under the first viscose layer 11 (as shown in FIG. 3; similarly hereinafter), that is, the carrier layer 12 adheres to a lower plane of the first viscose layer 11, and consists of paper carriers, cellulose carriers, polypropylene-based carriers, or water-soluble carriers which are indicated in a preferred embodiment; the split layer 13 is under the carrier layer 12, that is, the split layer 13 adheres to a lower plane of the carrier layer 12, and is a starchy layer consisting of starch; the second viscose layer 14 is under the split layer 13, that is, the second viscose layer 14 adheres to a lower plane of the split layer 13, and consists of water-soluble viscose such as acrylic viscose. It is notable that the first viscose layer 11 or the second viscose layer 14 in the present invention is not limited to one composition hereinbefore such as water-soluble viscose which can be replaced by alternative proper viscose.

Starch as one composition in the split layer 13 is polysaccharide comprising natural high molecular compounds, e.g., amylase or amylopectin, which are environment-friendly and completely conform to demand for energy efficiency, low carbon emission and environmental protection; furthermore, starch as a natural high polymer rich in the Mother Nature has been taken as a staple in common human diets, for instance, potato, wheat, corn, rice and cassava, and is a mass-produced affordable product which constitutes the split layer 13 with advantages such as proper viscosity and cohesion.

The de-bounding layer 20 is coated on the first viscose layer 11, that is, the de-bounding layer 20 adheres to an upper plane of the first viscose layer 11, and taken as a protective layer which covers the tape body 10, comprising a paper (thin-film) substrate and a methicone/polyethylethlene-based release coating and spread on the substrate for viscose. The de-bounding layer 20 with at least one lateral wider than the first viscose layer 11 comprises a protrudent part 21 on at least one side which is easily removed by one user, makes the de-bounding layer 20 separable from the first viscose layer 11, and is not covered by a release coating. In a preferred embodiment, the de-bounding layer 20 is provided with two protrudent parts 21 at its both sides which are designed to have a same width (different widths) and easily removed by one user for separation of the de-bounding layer 20 from the first viscose layer 11.

Figure 4:
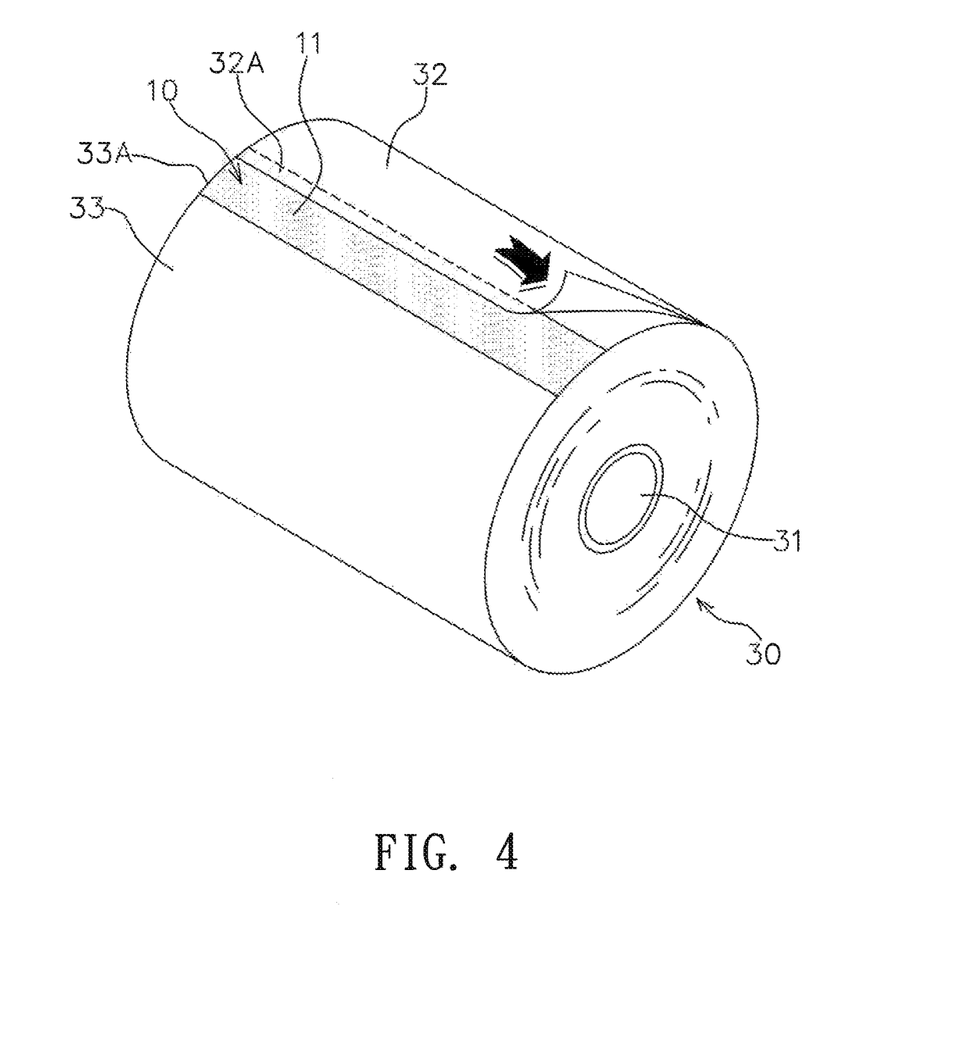
FIG. 4 is a schematic view of the present invention stuck on a paper reel.
Figure 5:
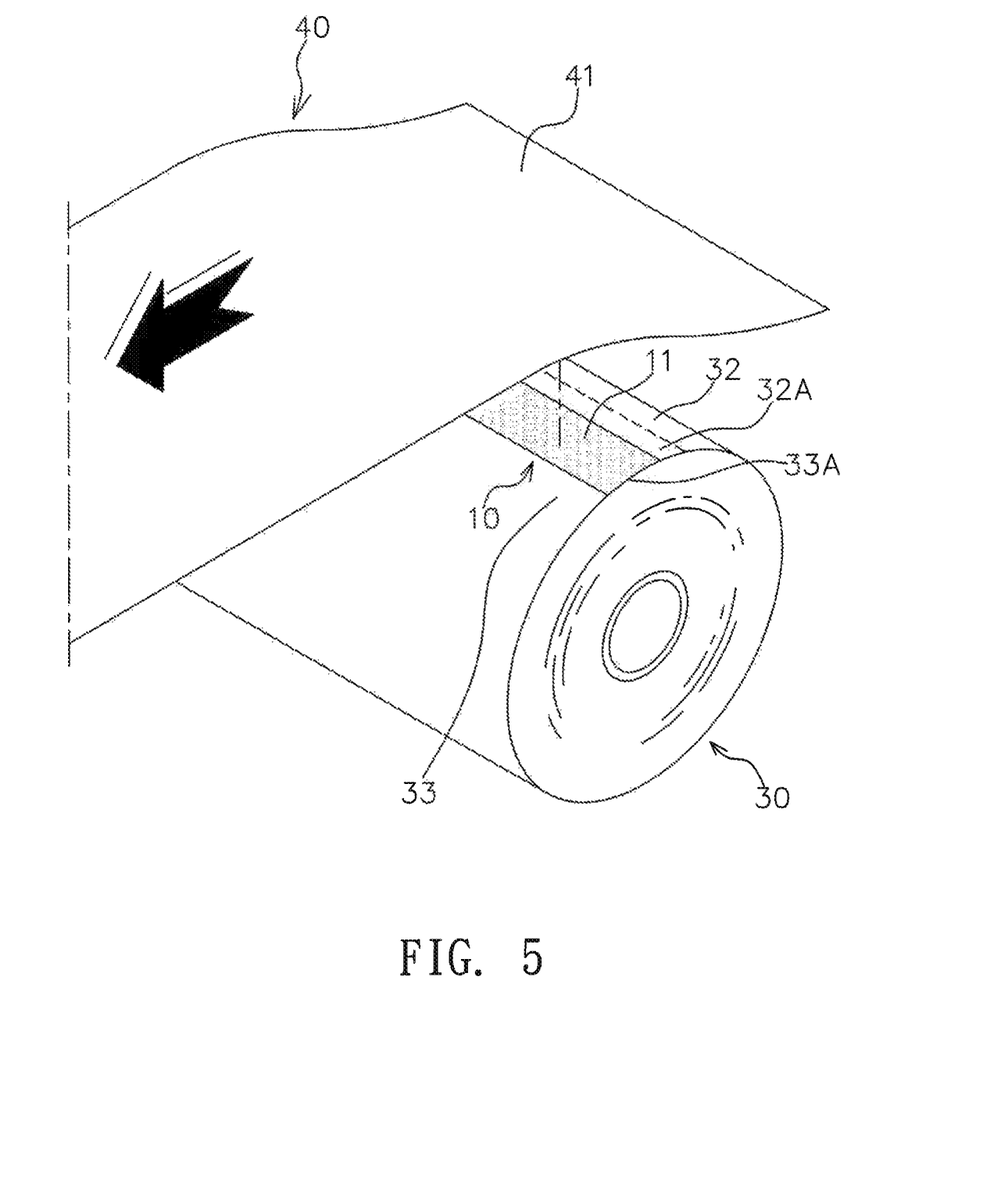
FIG. 5 is a perspective view of the present invention which is being fast connected.

Referring to FIGS. 4 and 5 which illustrate the present invention of a flying splices tape in one embodiment for a fast connection and a flying splice of rolled-up paper sheets (or laminate sheets): the tape body 10 from which the de-bounding layer 20 is removed adheres to a paper reel 30 comprising a paper sheet 32 wound around a reel drum 31 and is provided with a paper leading edge 32A over the coiled paper sheet 32. The method of sticking the present invention refers to a lateral local region of the first viscose layer 11 of the tape body 10 on which a lower surface of the paper leading edge 32A is stuck but other regions of the first viscose layer 11 kept unoccupied (and upward) due to no paper leading edge 32A stuck; the second viscose layer 14 of the tape body 10 adheres to a lower paper sheet 33 which is in front of the paper leading edge 32A in order to define one region next to a joint of the lower paper sheet 33 and the paper leading edge 32A as a lower paper sheet adhesion segment 33A on which the second viscose layer 14 can be stuck. A paper reel 40 in operation is designed to have a paper sheet terminal 41 which reveals the paper reel 40 to be exhausted and the paper reel 30 comprises a paper sheet for constant printing on a paper sheet in the paper reel 40.

Figure 6:
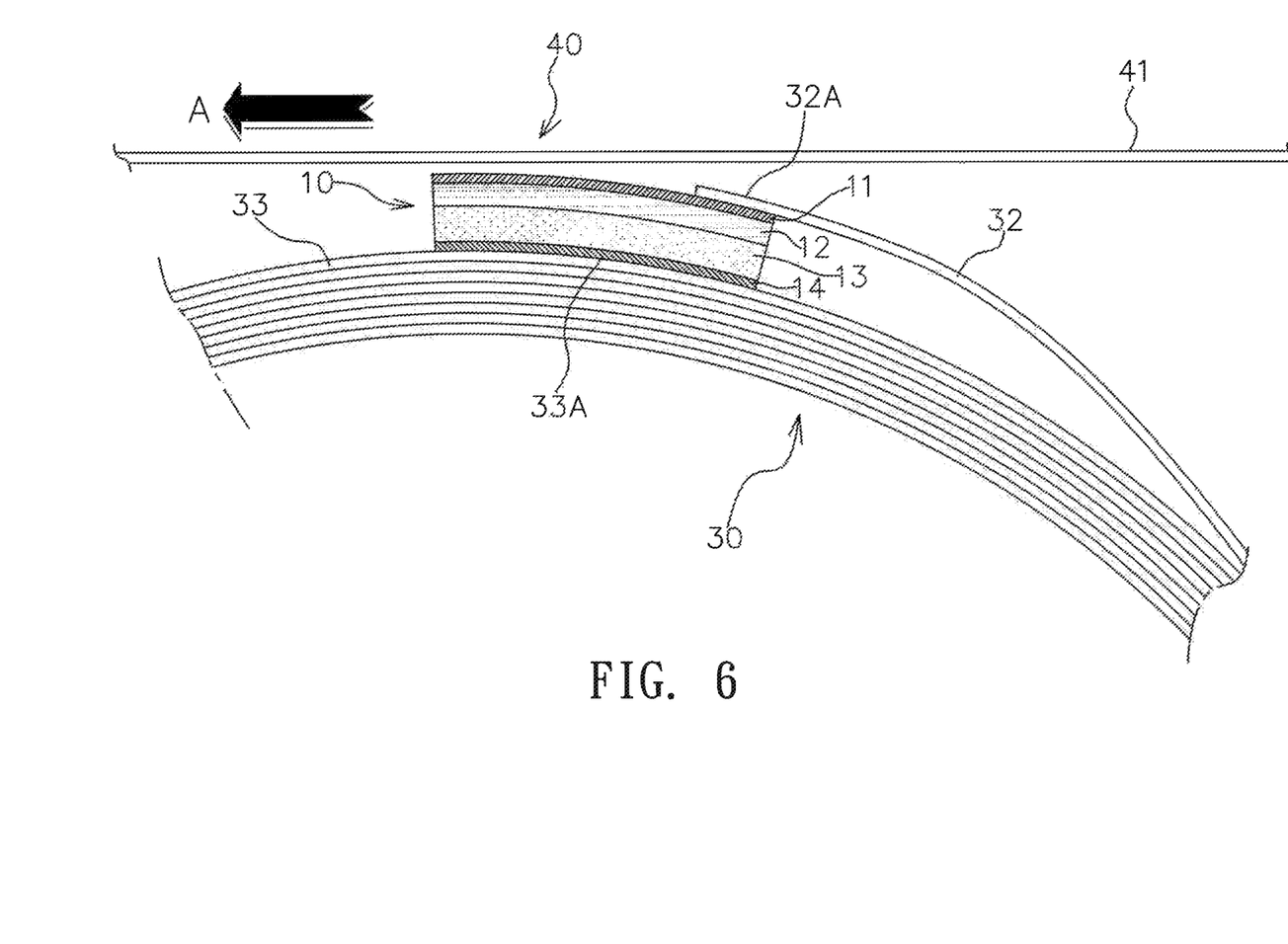
FIG. 6 is a first sectional view of the present invention which is being fast connected.
Figure 7:
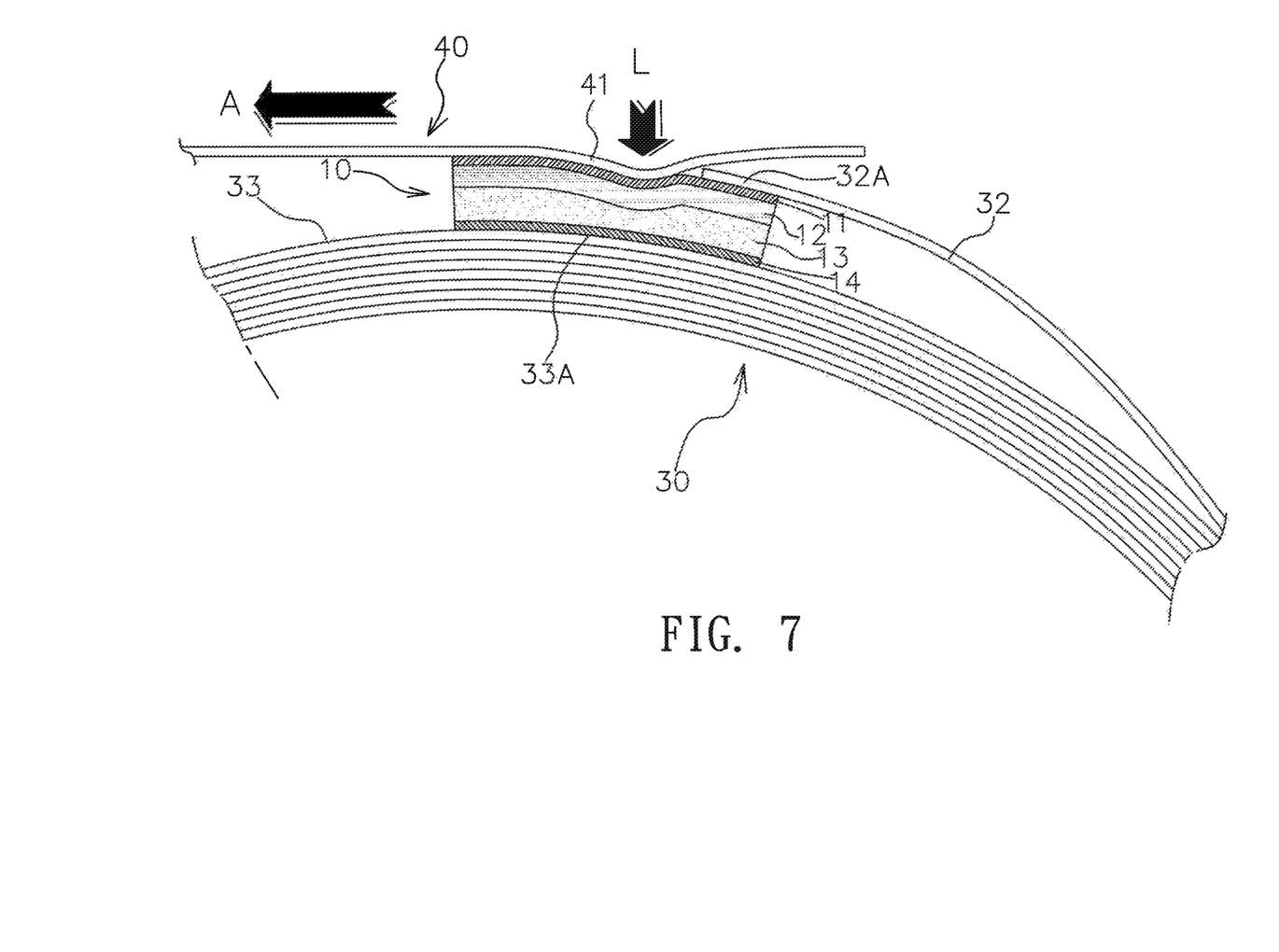
FIG. 7 is a second perspective view of the present invention which is being fast connected.

Referring to FIGS. 6 and 7 which illustrate the paper sheet terminal 41 of the paper reel 40 in operation passes through and overlaps the paper reel 30 sustaining the tape body 10 and is partially stuck on the (locally unoccupied) first viscose layer 11 under effect of a tension-induced pressure L in Direction A for adhesion of the paper sheet terminal 41 of the paper reel 40 to the paper leading edge 32A and the lower paper sheet 33 in the paper reel 30 (FIG. 7).

Figure 8:
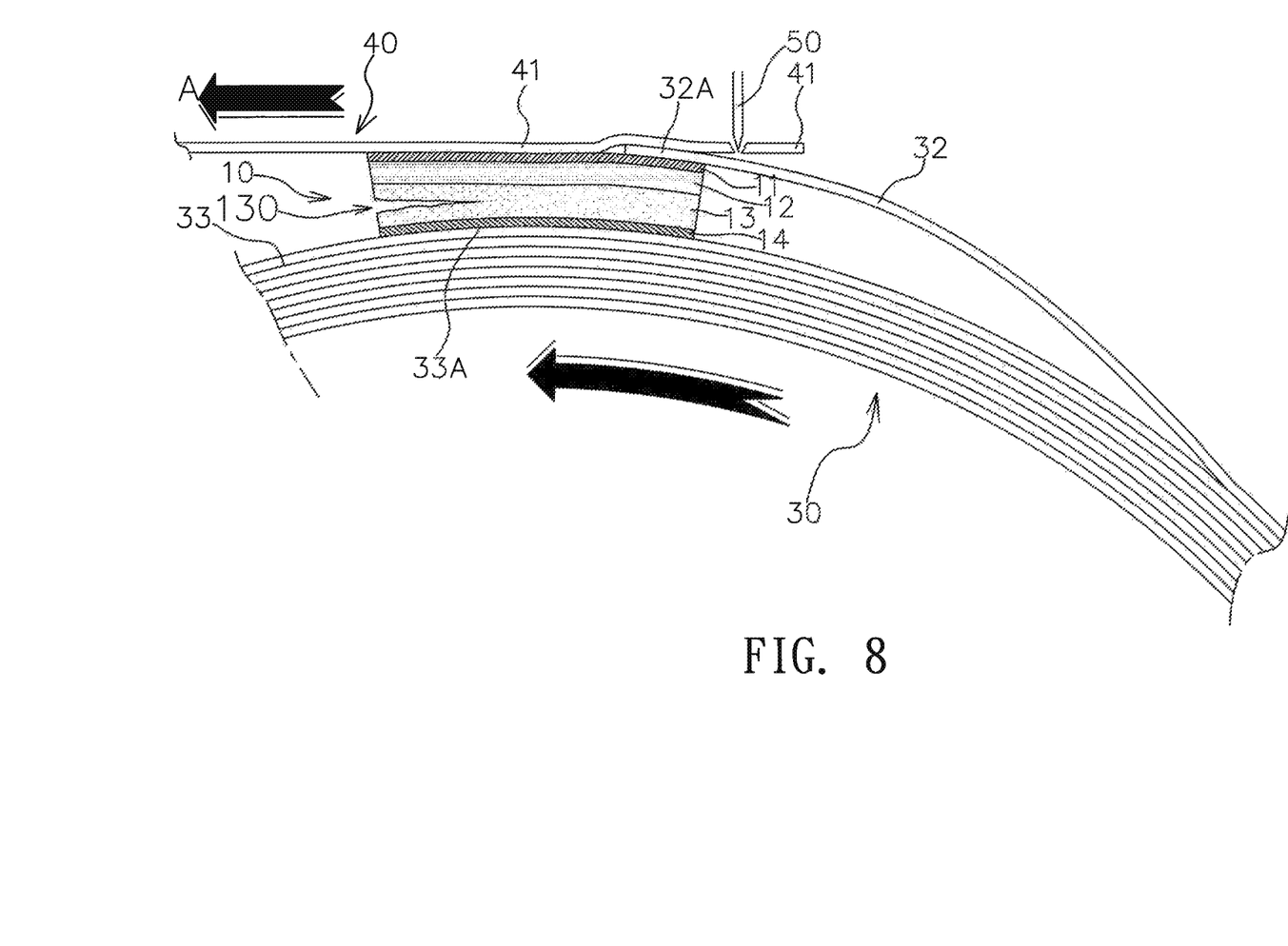
FIG. 8 is a third perspective view of the present invention which is being fast connected.
Figure 9:
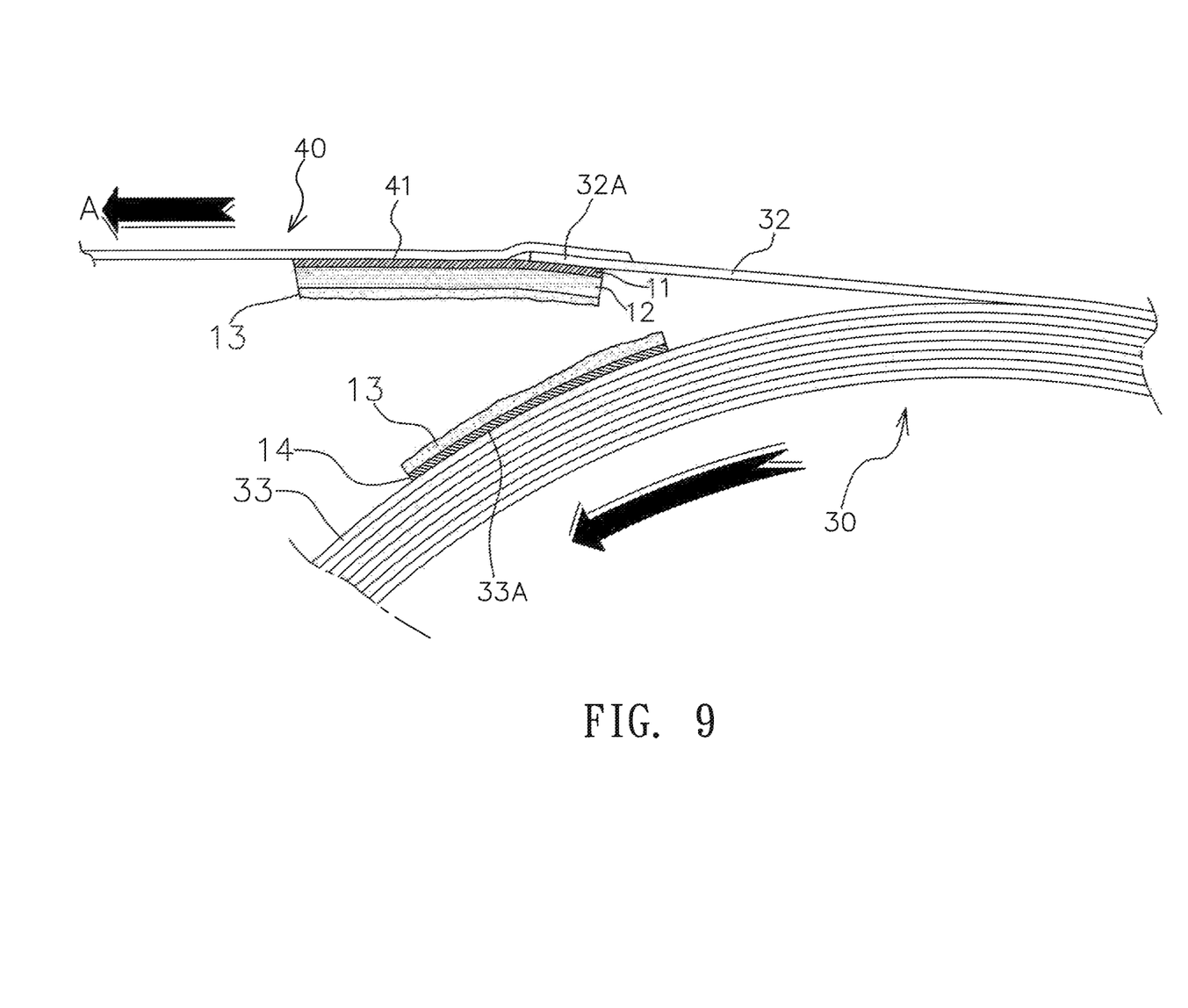
FIG. 9 is a fourth perspective view of the present invention which is being fast connected.

Referring to FIGS. 8 and 9 which illustrate the paper sheet terminal 41 under effect of tension in Direction A continuously passes through the tape body 10 and joins the paper leading edge 32A and the paper sheet 33 in the paper reel 30. The tension in Direction A continuously applied on the tape body 10 and the paper reel 30 produces a fracture 130 within the split layer 13 which allows the split layer 13, the first viscose layer 11, and the second viscose layer 14 to be split with the paper sheet terminal 41 disconnected by a cutter 50, making the paper leading edge 32A separated without intervention of the lower paper sheet 33. Meanwhile, the paper reel 30 continues revolution and feeding of a paper sheet by linking the paper sheet terminal 41 and replacing the paper reel 40 to be exhausted because the first viscose layer 11 is still stuck on the paper sheet terminal 41 and the paper leading edges 32A of the paper reel 30.

Figure 10:
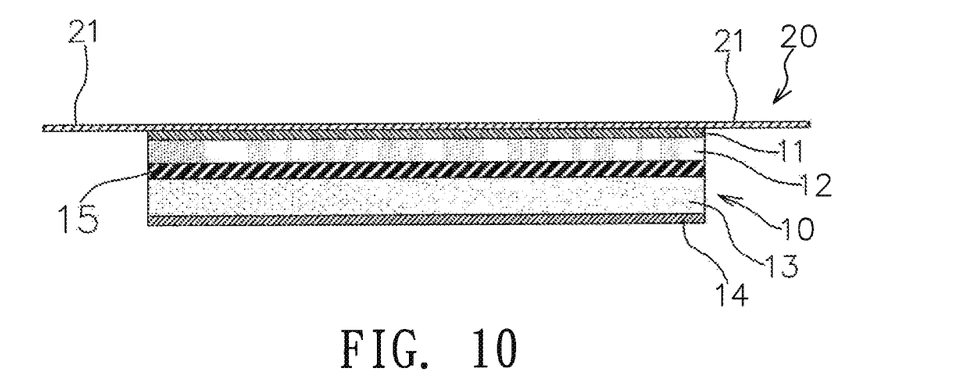
FIG. 10 is a sectional view of the present invention which is being fast connected in a further embodiment.

Referring to FIG. 10 which illustrates the present invention comprises a tape body 10 and a de-bounding layer 20 in a further embodiment: the tape body 10 and the de-bounding layer 20 are combined and wound around a reel drum 101 for development of a conveniently used successive tape 100 (see FIG. 2); the tape body 10 comprises top-down layers such as a first viscose layer 11, a carrier layer 12, a split layer 13, and a second viscose layer 14 in which there is a further feature, e.g., an isolation layer 15 coated between the carrier layer 12 and the split layer 13 and keeping not only the carrier layer 12 not permeated by viscose in the split layer 13 but also strong viscosity of the split layer 13.

Figure 11:
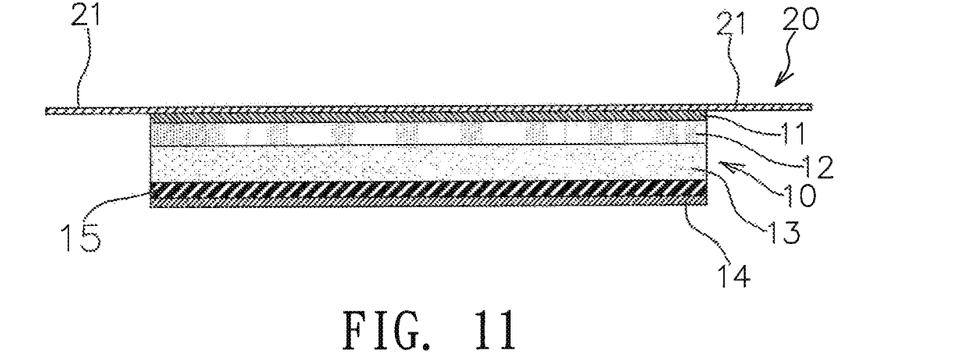
FIG. 11 is sectional view of the present invention which is being fast connected in still a further embodiment.

Referring to FIG. 11 which illustrates the present invention comprises a tape body 10 and a de-bounding layer 20 in still a further embodiment: the tape body 10 and the de-bounding layer 20 are combined and wound around a reel drum 101 for development of a conveniently used successive tape 100 (see FIG. 2); the tape body 10 comprises top-down layers such as a first viscose layer 11, a carrier layer 12, a split layer 13, and a second viscose layer 14 in which there is a further feature, e.g., an isolation layer 15 coated between the split layer 13 and the second viscose layer 14 and keeping not only the second viscose layer 14 not permeated by viscose in the split layer 13 but also strong viscosity of the split layer 13.

In the above disclosure, the present invention sustains cohesive forces as follows: (a) cohesive force "A" in the split layer 13; (b) cohesive force "B" between the first viscose layer 11 and the paper sheet terminal 41 of the paper reel 40 or the paper leading edge 32A of the paper reel 30 (i.e., between paper sheets or other laminate sheets); (c) cohesive force "C" between the first viscose layer 11 and the carrier layer 12; (d) cohesive force "D" between the carrier layer 12 and the split layer 13; (e) cohesive force "E" between the split layer 13 and the second viscose layer 14; (f) cohesive force "F" between the second viscose layer 14 and the lower paper sheet adhesion segment 33A (i.e., between paper sheets or other laminate sheets); the split layer 13 in the tape body 10 under effect of tension is first split for completion of a fast connection (or a flying splice) of paper sheets because cohesive force "A" is smaller than cohesive force "B", "C", "D", "E", or "F".

In the present invention of a flying splices tape, both the first viscose layer 11 and the second viscose layer 14 are based on acrylic viscose, a water-soluble material; preferably, the carrier layer 12 is made up of water-soluble carriers. In other words, the tape body 10 is dissolved in water as a substitution of a solvent, unharmful to environment or ecology, and conveniently recycled because the first viscose layer 11, the second viscose layer 14 and the carrier layer 12 are water-soluble.

In the present invention of a flying splices tape, the isolation layer 15 is manufactured with oil-based material such as silicon-free anti-sticking agent, alkyl carbamate, carbamic acid alkyl mixed with fatty alcohols, or amide resin.

In the present invention of a flying splices tape, the isolation layer 15 is manufactured with water-based material such as water-soluble alkyl carbamate, water-soluble fluoropolymer, water-soluble acrylic acid, water-soluble polyester, or water-soluble hydrocarbon.

Accordingly, the present invention of a flying splices tape which features simplified structure and truly stable effect facilitates manufacture conforming to economic efficiency, makes sure of quality and promotes market competitiveness; furthermore, the present invention based on water-soluble viscose layers as media is a superior environment-friendly product.

It can be seen from the above disclosure that the present invention as an excellent innovation meets patentability and is applied for the patent. However, the above descriptions present preferred embodiments only and any equivalent change or improvement based on the present invention should be incorporated in claims of the present invention.

What is claimed is:

1. A flying splices tape used in joining two rolled-up laminate sheets for splicing a leading edge over a first of the rolled up laminate sheets to another of the rolled-up laminate sheets, said flying splices tape comprising:
   a tape body, said tape body comprising:
   a first viscose layer;
   a carrier layer;
   a split layer; and
   a second viscose layer sequentially stacked,
   wherein said split layer is a starchy layer, and
   wherein said split layer, under effect of tension, produces a fracture within said split layer.

2. The flying splices tape according to claim 1, wherein said first viscose layer is coated with a de-bounding layer, said de-bounding layer comprising a protrudent part on at least one side of said de-bounding layer.

3. The flying splices tape according to claim 2, wherein both said tape body and said de-bounding layer are combined as one reel when stored.

4. The flying splices tape according to claim 2, wherein said de-bounding layer comprises two protrudent parts at both sides of said de-bounding layer.

5. The flying splices tape according to claim 1, wherein said first viscose layer consists of water-soluble viscose.

6. The flying splices tape according to claim 5, wherein said first viscose layer consists of acrylic viscose.

7. The flying splices tape according to claim 1, wherein said carrier layer consists of water-soluble carriers.

8. The flying splices tape according to claim 1, wherein said carrier layer consists of paper carriers, cellulose carriers or polypropylene-based carriers.

9. The flying splices tape according to claim 1, wherein said second viscose layer consists of water-soluble viscose.

10. The flying splices tape according to claim 9, wherein said second viscose layer consists of acrylic viscose.

11. The flying splices tape according to claim 1, wherein said split layer is based on starch comprising high molecular compounds or, amylase or high molecular compounds of amylopectin.

12. The flying splices tape according to claim 1, wherein said layers sustain cohesive forces as follows: cohesive force A in said split layer, cohesive force B between said first viscose layer and a laminate sheet, cohesive force C between said first viscose layer and said carrier layer, cohesive force D between said carrier layer and said split layer, cohesive force E between said split layer and said second viscose layer, cohesive force F between said second viscose layer and an alternative laminate sheet; cohesive force A is smaller than cohesive force B, C, D, E, or F.

13. The flying splices according to claim 1, further comprising an isolation disposed between said carrier layer and said split layer to prevent viscose, from said split layer, from permeating said carrier layer.

14. The flying splices according to claim 13, wherein said isolation layer is manufactured with oil-based material, said oil-based material comprising silicon-free anti-sticking agent, alkyl carbamate, carbamic acid alkyl mixed with fatty alcohols, or amide resin.

15. The flying splices according to claim 13, wherein said isolation layer is manufactured with water-based material, said water-based material comprising water-soluble alkyl carbamate, water-soluble fluoropolymer, water-soluble acrylic acid, water-soluble polyester, or water-soluble hydrocarbon.

16. The flying splices according to claim 1, further comprising an isolation disposed between said second viscose layer and said split layer to prevent viscose, from said split layer, from permeating said second viscose layer.

17. The flying splices according to claim 16, wherein said isolation layer is manufactured with oil-based material, said oil-based material comprising as silicon-free anti-sticking agent, alkyl carbamate, carbamic acid alkyl mixed with fatty alcohols, or amide resin.

18. The flying splices according to claim 16, wherein said isolation layer is manufactured with water-based material, said water-based material comprising water-soluble alkyl carbamate, water-soluble fluoropolymer, water-soluble acrylic acid, water-soluble polyester, or water-soluble hydrocarbon.

* * * * *